United States Patent [19]

Hsu et al.

[11] Patent Number: 5,623,284

[45] Date of Patent: Apr. 22, 1997

[54] INPUT DEVICE CONTROLLER

[75] Inventors: Kuo-Yuan Hsu; Jyn-Guo Hwang, both of Hsin-Chu, Taiwan

[73] Assignee: Elan Microelectronics Corporation, Hsin-Chu, Taiwan

[21] Appl. No.: 423,686

[22] Filed: Apr. 18, 1995

[51] Int. Cl.$^6$ .................................................. G08C 21/00
[52] U.S. Cl. .......................... 345/166; 250/200; 250/206; 250/206.1; 250/551
[58] Field of Search ................................... 250/200, 206, 250/206.1, 551; 345/166

[56] References Cited

U.S. PATENT DOCUMENTS 4,807,166  2/1989  Zalenski .............................. 364/571.06

5,418,381  5/1995  Aizawa .................................... 250/551

Primary Examiner—Raymond J. Bayerl
Assistant Examiner—Vincent E. Kovalick

[57] ABSTRACT

The present invention is related to an input device controller having a photo coupler generating an induced current in response to a received quantum of light and using multi-stage, e.g. three-stage, dynamic impedances as an impedance match to obtain better frequency response and accurate identification of light-pass/light-shield state of the photo coupler. It also related to an input device controller using a reference voltage supply circuit including a constant current generator and an equivalent circuit to avoid the bad effect on the cursor shift control caused by the variation of the reference voltage.

25 Claims, 5 Drawing Sheets

INPUT DEVICE CONTROLLER

FIELD OF THE INVENTION

The present invention is related to a controller, and particularly to an input device controller.

BACKGROUND OF THE INVENTION

A mouse or a track ball is an input device for controlling the motion of a cursor on a monitor. A mouse controller is a device installed in a mouse for executing the cursor-control function of the mouse. A similar device can be applied to a track ball for executing the cursor-control function of the track ball.

Please refer to FIG. 1 which is a schematic circuit diagram showing a mouse including a first kind of conventional mouse controller. The mouse shown in FIG. 1 includes a photo coupler 1 composed of a light-emitting diode 11 and a photo diode 12, a mouse controller 2 composed of a constant resistor R21, a reference voltage supplier Vref, a comparator 22 and a shift controller 23, and a limited current resistor R1. When the ball of the mouse (not shown) drives a grid wheel of the mouse (not shown), the light-emitting diode 11 provides a light source emitting through the holes spacedly arranged on the grid wheel to be intermittently received by the photo diode 12. The photo diode 12 generates an induced current in response to the quantum of the received light. The constant resistor R21 causes the output terminal A of the photo coupler 1 to output a voltage in response to the induced current. The comparator 22 compares the value of the voltage at the location A with that of the reference voltage generated by the reference voltage supplier Vref to obtain a digital state (0,1) state, thereby detecting the rotation situation of the grid wheel. The shift controller 23 receives the digital state to control the motion of the cursor on the monitor.

Owing to the transient capacitor effect, when the voltage value at A increases, a value of the voltage in response to the maximal induced current is reached at the input terminal In1 of the comparator 22 after a period of capacitor charging time. That result in an accurate input voltage value obtained by the comparator 22 for being compared with the reference voltage. A more precise result is thus able to be obtained. On the contrary, when the induced current declines, a period of discharging time is also required for achieving a more accurate comparison. However, because resistor R21 is a constant resistor, the resistance thereof cannot vary with the voltage value at A. In other words, the charging and/or discharging time R×C (resistance times capacitance) of the photo diode 12 cannot be shortened. If the changing rate of the light-shield/light-pass state through the grid wheel is too high, an erroneous comparing result will possibly be generated by the comparator 22 so that the frequency response of this kind of conventional mouse controller is unsatisfactory. In addition, the light-leakage phenomenon occurred in the photo coupler 1 often influences the operation result of the comparator 22. Therefore, this kind of mouse controller is suitable only for applications in which high resolution is not required.

Please refer to FIG. 2 which is a schematic circuit diagram showing a mouse including a second kind of conventional mouse controller. In FIG. 2, a photo coupler 3 and a mouse controller 4 are shown. The photo coupler 3 includes a light-emitting diode 31 and a photo diode 32. The mouse controller 4 includes a constant resistor R411, dynamic resistor means M412 being a MOS transistor, a comparator 42, a reference voltage supplier Vref, and a shift controller 43. The circuit diagram shown in FIG. 2 includes all the circuit shown in FIG. 1 and the identical portions of the circuits in both figures perform the same function. The difference between the first and the second kinds of conventional mouse controllers lies in that the second one includes the dynamic resistor means M412 which is absent in the first one. The dynamic resistor means M412 is a MOS transistor. As what is known to those skilled in the art, the impedance of a MOS transistor will decrease with the increase of the input voltage after the MOS transistor is conducted. Therefore, when the voltage value at B increases, the impedance of the dynamic resistor means M412 will decrease to shorten the charging time R×C of the photo diode 32. The aforementioned result is supported by the reason that the resistor R411 and the dynamic resistor means M412 are connected in parallel. When the impedance of the dynamic resistor means M412 decreases, the equivalent resistance R decreases, too, and thus the charging time R×C is shortened. This kind of conventional mouse controller has a better frequency response and can overcome the light-leakage phenomenon which occurs in the photo coupler 3, thereby obtaining a higher resolution.

Unfortunately, there are still problems encountered in the detection and comparison operations of this kind of mouse controller 4. In general, the reduction of the charging time will assure a good detection in the light-pass state through the grid wheel. The reduction of the discharging time is also preferably required in the light-shield state through the grid wheel. Shorter charging/discharging time will cause clear high/low pulses to be produced to obtain accurate detection. On the contrary, improper charging/discharging time will render the waveforms of two cycles to overlap. Although, under a light-pass state where a relatively higher voltage at B is caused by the light passing through the grid wheel and received via the photo diode, the dynamic resistor means M412 enables the comparator 42 to operate. However, under a light-shield state, the dynamic resistor means M412 cannot discharge promptly the charges at B, and therefore, the detection and comparison operation of the comparator 42 are adversely influenced.

The reference voltage supplier Vref shown in FIG. 1 or 2 is illustrated as follows with reference to FIG. 3. As shown in FIG. 3, the reference voltage supplier Vref includes two voltage-dividing resistors Rd1 and Rd2. The voltage value supplied from this kind of reference voltage supplier Vref is subject to variation in response to the change of the work voltage $V_{DD}$, and thus the operation result of the comparator is possibly erroneous.

An object of the present invention is to provide an input device controller using multi-stage dynamic impedances for an impedance match to obtain better frequency response and accurate identification of light-pass/light-shield state.

Another object of the present invention is to provide an input device controller using a reference voltage supplier including a constant current generator and an equivalent circuit to avoid the bad effect on the cursor shift control, caused by the variation of the reference voltage.

In accordance with the present invention, an input device controller to be used with an input device having a photo coupler generating an induced current in response to a received quantum of light includes a first resistor means electrically connected to the photo coupler in order that the photo coupler has an output voltage in response to the induced current, a second resistor means electrically connected to the photo coupler and having the resistance thereof varying with the output voltage for preventing the photo coupler from being overcharged, and a controlling means electrically connected to the photo coupler for controlling a cursor on a monitor in response to the output voltage.

The controlling means includes a reference voltage supply circuit for supplying a reference voltage, a comparator having a first input terminal electrically connected to the photo coupler and a second input terminal electrically connected to the reference voltage supply circuit for comparing the output voltage and the reference voltage to output a digital signal, and a shift controller electrically connected to the comparator for controlling a movement of the cursor on the monitor in response to the digital signal.

The first resistor means is a constant resistor. The second resistor means is a dynamic resistor means preferably including a plurality of metal-oxide-semiconductor field-effect transistors (MOSEFTs) and a Bipolar Junction Tranisitor (BJT). The dynamic resistor has an impedance which decreases with the increase of the output voltage of the photo coupler. The present input device controller preferably further includes a third resistor means electrically connected between the first and the second resistor means and having the resistance thereof vary with the output voltage of the photo coupler. The third resistor means is a dynamic resistor means preferably including a MOSFET and the impedance thereof decreases with the increase of the output voltage of the photo coupler. The maximum value of the impedance of the third resistor means is smaller than that of the first resistor means but greater than that of the second resistor means.

The reference voltage supply circuit preferably includes a constant current generator for generating a constant current, and a dynamic impedance-input circuit electrically connected between the constant current generator and the second input terminal of the comparator, and including a constant input resistor performing the same function as the first resistor means and a first dynamic input resistor performing the same function as the third resistor means so that the comparator is able to compare the output voltage of the photo coupler with the reference voltage by comparing the induced current generated by the photo diode with the constant current generated by the constant current generator. A value of the constant current generated by the constant current generator is within a current range measured at the first input terminal of the comparator when the second resistor means is conducted.

The constant current generator preferably includes a voltage-dividing resistor means including two resistors, a voltage-dividing comparator, one input terminal of which is electrically connected between the two resistors of the voltage-dividing resistor means, a MOSFET, the gate of which is electrically connected to an output terminal of the voltage-dividing comparator, a current-adjusting resistor electrically connected to another input end of the voltage-dividing comparator and the source of the MOSFET for adjusting the constant current, and a current mirror electrically connected between a drain of the MOSFET and the dynamic impedance-input circuit. On the other hand, the dynamic impedance-input circuit preferably further includes a second dynamic input resistor performing the same function as the second resistor means, and electrically connected between the first dynamic input resistor and the second input terminal of the comparator.

In accordance with another aspect of the present invention, an input device controller to be used with an input device having a photo coupler generating an induced current in response to a received quantum of light comprising a first resistor means electrically connected to the photo coupler in order that the photo coupler has an output voltage in response to the induced current, a second resistor means electrically connected to the photo coupler and having the resistance thereof varying with the output voltage, a constant current generator for generating a constant current, a dynamic impedance-input circuit electrically connected to the constant current generator and including a first input resistor having a resistance characteristic identical to that of the first resistor means and a second input resistor performing the same function as the second resistor means, and a controlling means electrically connected to the photo coupler and the constant current generator for controlling a movement of a cursor on a monitor in response to a compared result of the induced current and the constant current.

Each of the first resistor means and the first input resistor is a constant resistor, and each of the second resistor means and the second input resistor is a dynamic resistor means including a MOSFET and having an impedance which decreases with an increase of the output voltage of the photo coupler.

The controlling means includes a comparator having a first input terminal electrically connected to the photo coupler and a second input terminal electrically connected to the constant current generator for comparing the induced current and the constant current to output a digital signal, and a shift controller electrically connected to the comparator for controlling the movement of the cursor on the monitor in response to the digital signal. A value of the constant current generated by the constant current generator is within a current range measured at the first input terminal of the comparator if the second resistor means is not conducted.

The present input device controller preferably further includes a third resistor means electrically connected to the photo coupler and having the resistance thereof varying with the output voltage, and the dynamic impedance-input circuit further including a third input resistor electrically connected between the first input resistor and the second input terminal of the comparator and performing the same function as the third resistor means. Each of the third resistor means and the third input resistor is a dynamic resistor means including a plurality of MOSFETs and a BJT, and the impedance of the dynamic resistor means decrease with the increase of the output voltage of the photo coupler. The maximum of the impedance of the second resistor means is smaller than that of the first resistor means but greater than that of the third resistor means. In this situation, a value of the constant current generated by the constant current generator is within a current range measured at the first input terminal of the comparator when the third resistor means is conducted.

The constant current generator preferably includes a voltage-dividing resistor means including two resistors, a voltage-dividing comparator, one input terminal of which is electrically connected between the two resistors of the voltage-dividing resistor means, a MOSFET, the gate of which is electrically connected to an output terminal of the voltage-dividing comparator, a current-adjusting resistor electrically connected to another input end of the voltage-dividing comparator and the source of the MOSFET for adjusting the constant current, and a current mirror electrically connected between a drain of the MOSFET and the dynamic impedance-input circuit.

The present input device controller is preferably used for an input device such as a mouse.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 4:
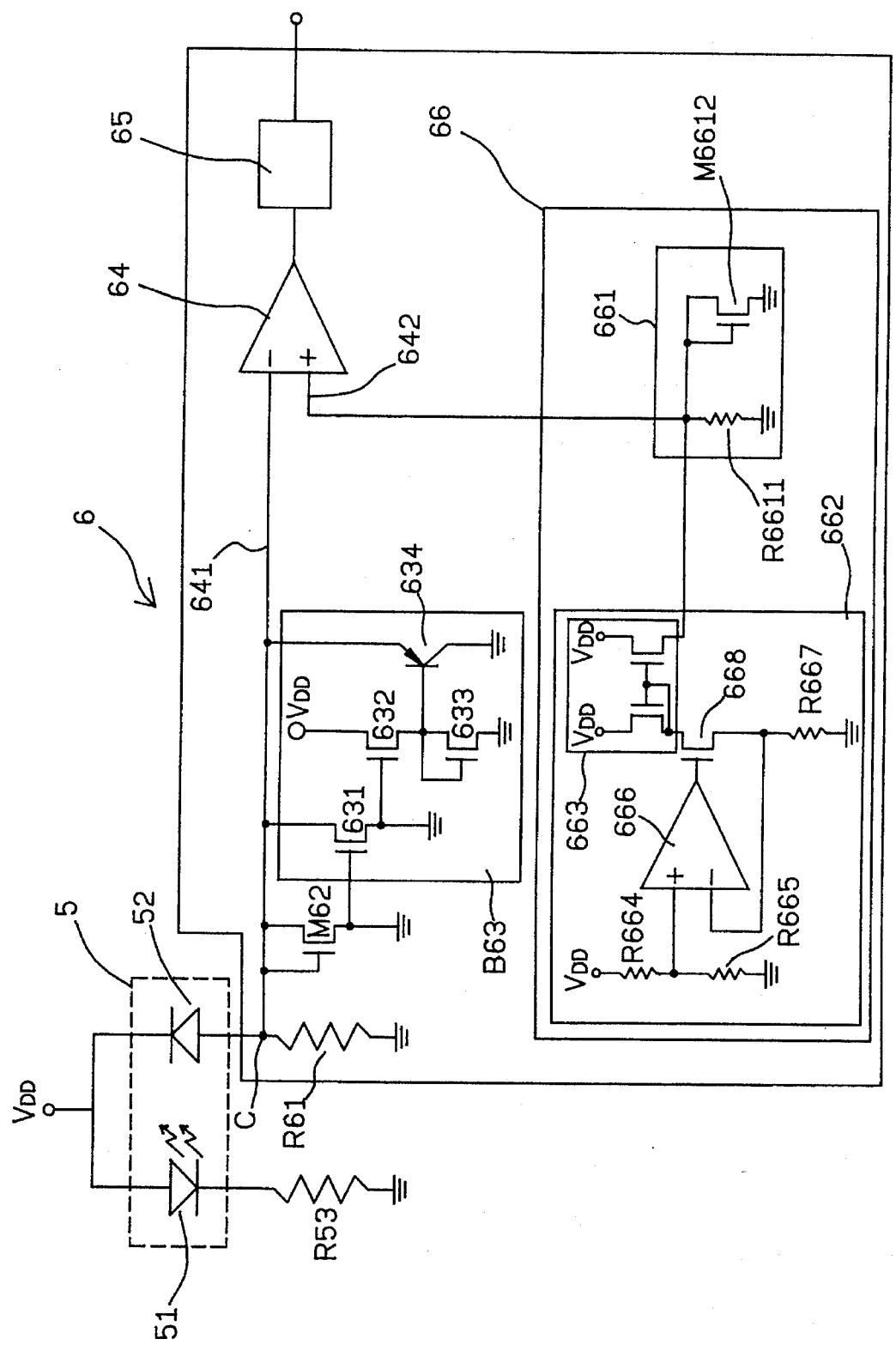
FIG. 4 is a schematic circuit diagram showing a mouse including a preferred embodiment of a mouse controller according to the present invention.

Please refer to FIG. 4 which is a schematic circuit diagram showing a mouse including a preferred embodiment of a mouse controller according to the present invention. The mouse shown in FIG. 4 includes a photo coupler 5 including a light-emitting diode 51 and a photo diode 52, a limited current resistor R53 and a mouse controller 6. The mouse controller includes a constant resistor R61 electrically connected to the photo coupler 5, a first dynamic resistor means M62 which consists of a MOSFET in this preferred embodiment and electrically connected to the constant resistor R61, a second dynamic resistor means B63 which includes a BJT and a plurality of MOS transistors in this case and is electrically connected to the first resistor means M62, a comparator 64 electrically connected to the photo coupler 5, and a shift controller 65 electrically connected to the comparator 64. One input terminal 641 of the comparator 64 is electrically connected to an output terminal of the photo coupler 5, while another input terminal 642 is electrically connected to a reference voltage supply circuit 66 which includes a dynamic impedance-input circuit 661 and a constant current generator 662. The dynamic impedance-input circuit 661 is electrically connected between the constant current generator 662 and the comparator 64, and includes a resistor 6611 and a MOS transistor M6612, wherein the resistor 6611 and the MOS transistor M6612 perform the same functions as the resistor R61 and the MOS transistor M62, respectively. The constant current generator 662 includes a voltage-dividing resistor means including two resistors R664 and R665, a voltage-dividing comparator 666 having one input terminal which is electrically connected between the two resistors R664 and R665, a MOSFET 668, the gate of which is electrically connected to the voltage-dividing comparator 666, a current-adjusting resistor R667 and a current mirror 663 electrically connected between a drain of the MOSFET 668 and the dynamic impedance-input circuit 661.

The actions and functions of the photo diode 52, the constant resistor R61, the first dynamic resistor means M62, the comparator 64 and the shift controller 65 are similar to those of the prior art ones so that they will not be redundantly described here.

Figure 5:
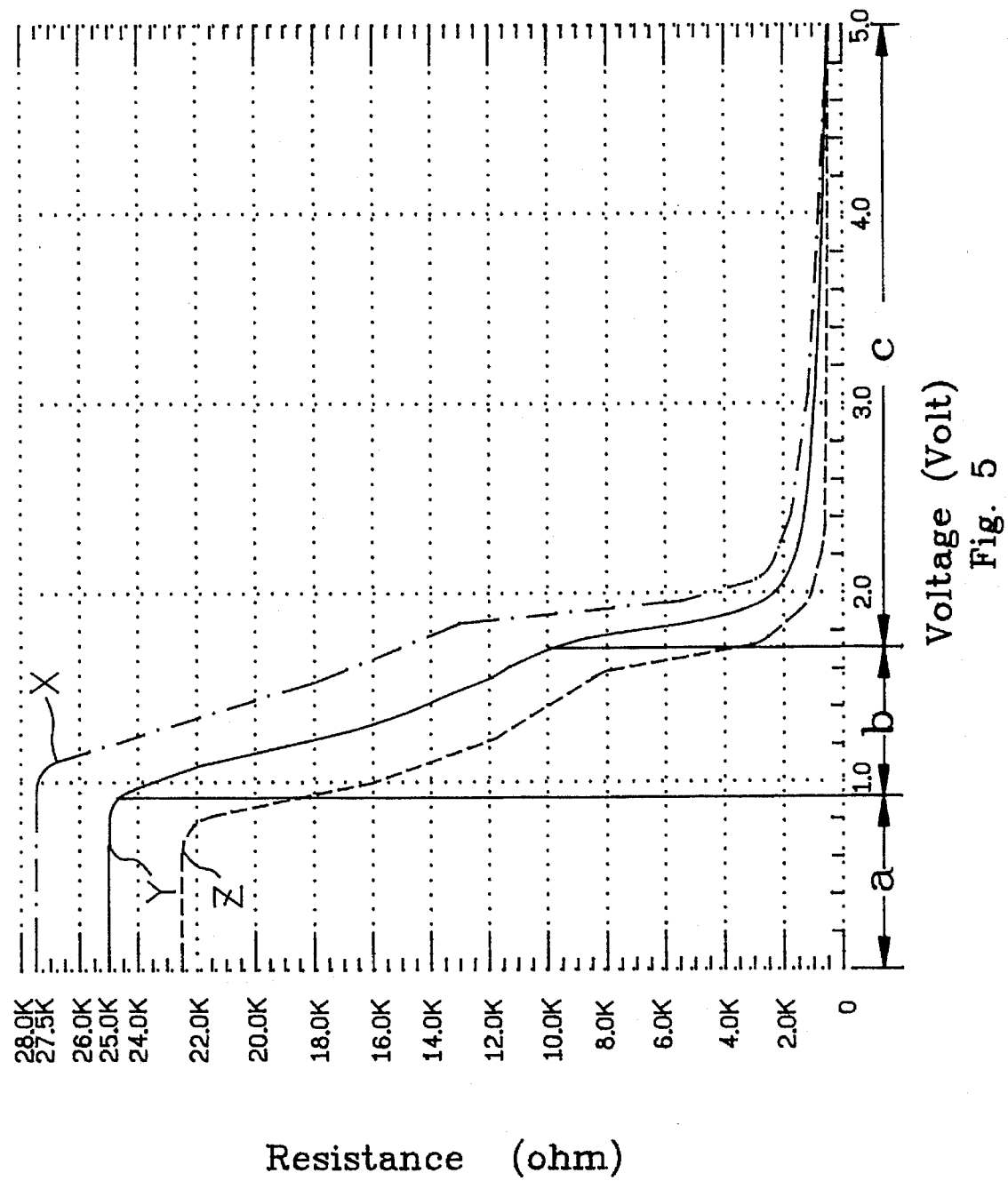
FIG. 5 is a resistance vs voltage plot showing the curve of the equivalent resistance of three resistor means varying with the output voltage of the photo coupler respectively at three kinds of resistance values of the constant resistor according to the present invention.

Please refer to FIG. 5 which is a resistance vs voltage plot showing the curve of the equivalent resistance of three resistor means varying with the output voltage of the photo coupler respectively at three kinds of resistance values of the constant resistor according to the present invention. The variation situations of the equivalent resistance of the three resistor means with the output voltage of the photo diode as shown in FIG. 5 will be described hereinafter by giving some points in the plot as examples. The curve Y represents the case that the resistance of R61 is 25 KΩ. When the voltage at C in FIG. 4 is about 1 volt, the resistor means M62 and B63 have not been conducted yet so that the equivalent resistance of R61//M62//B63 maintains at the original constant value, as illustrated by the section "a" of the plot. When the voltage at C increases and ranges between 1 and 1.7 volt, the resistor means M62 is conducted but the resistor means B63 has not been conducted and the equivalent resistance of R61//M62//B63 decreases, as illustrated by the section "b" of the plot. When the voltage at C is slightly over 1.7 volt, the resistance of the resistor means B63 decreases to a smaller value to have the curve of the equivalent resistance of R61//M62//B63 change as illustrated by the section "c" of the plot. When the voltage at C is rendered higher, e.g. much greater than 1.7 volt, the high voltage causes the resistor means B63 to be conducted, and thus results in the great decrement of the equivalent resistance of R61//M62//B63. In the meantime, the charges at C are rapidly discharged to avoid the overcharge phenomenon at C, and thus the mouse controller can have a better frequency response. Likewise, the curve X and curve Z are respectively represent the cases that the resistance of constant resistor R61 is 27.5 KΩ and 22.5 KΩ. Accordingly, the similar conclusion can be obtained.

Figure 1:
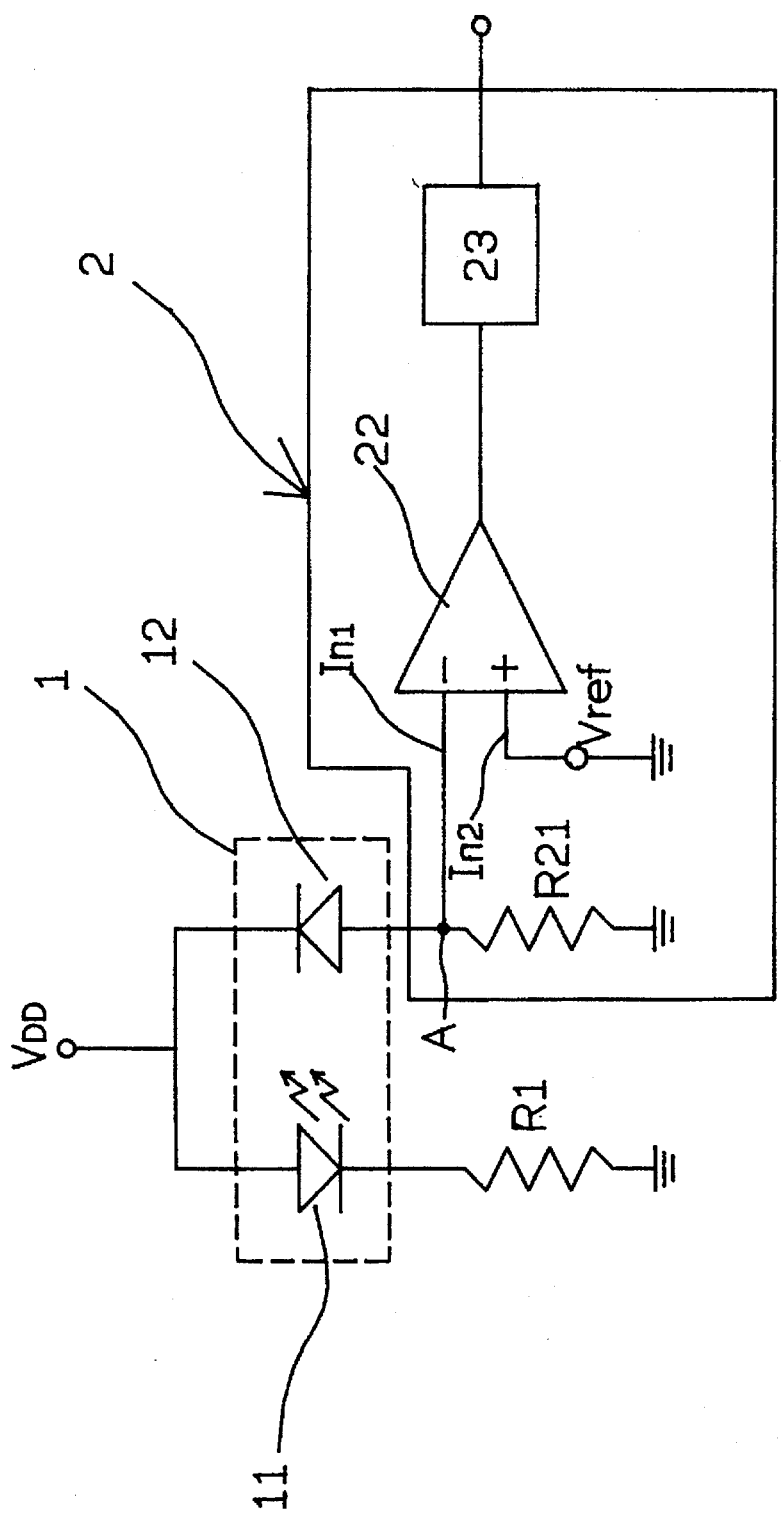
FIG. 1 is a schematic circuit diagram showing a mouse including a first kind of conventional mouse controller.
Figure 2:
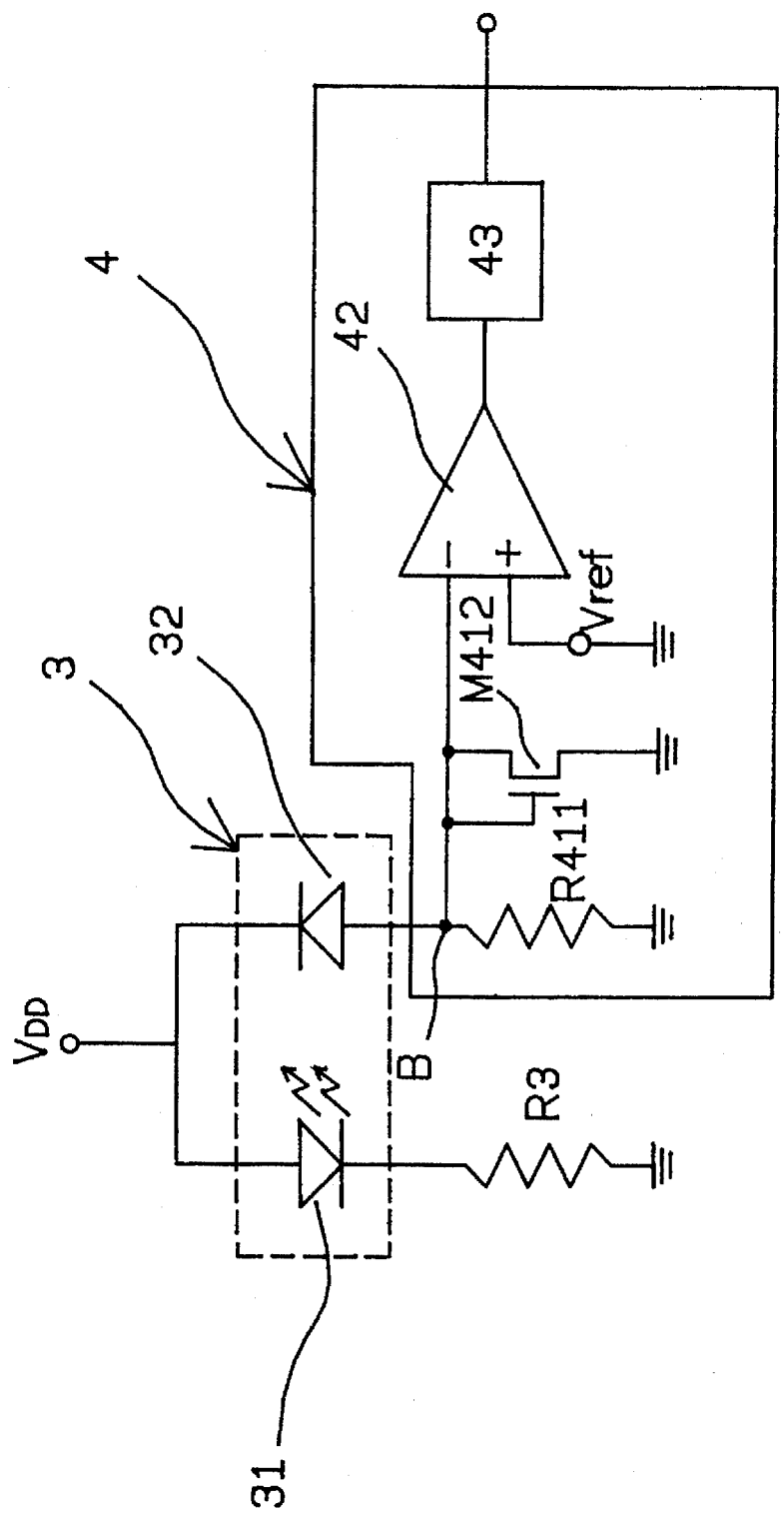
FIG. 2 is a schematic circuit diagram showing a mouse including a second kind of conventional mouse controller.
Figure 3:
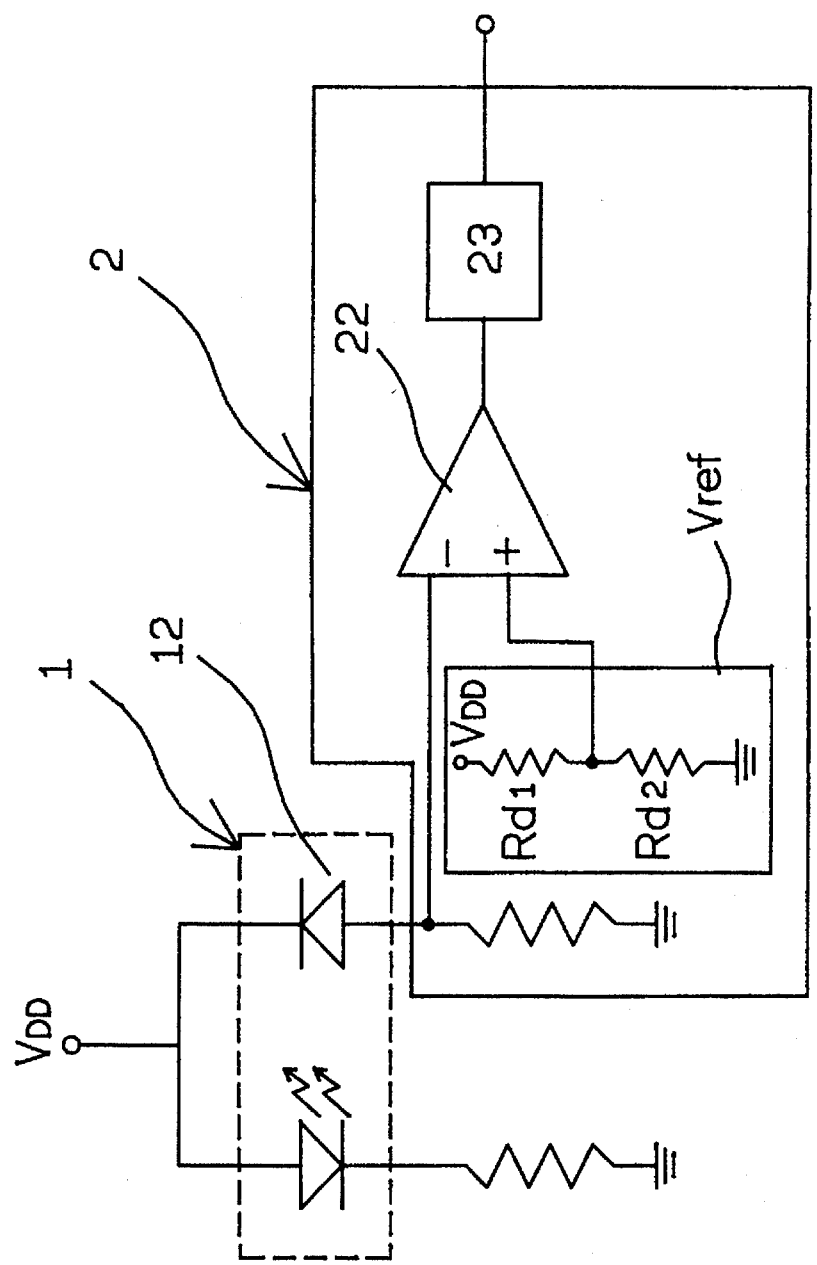
FIG. 3 is a schematic circuit diagram showing the mouse of FIG. 1 including a conventional reference voltage supplier Vref.

The reference voltage is generally supplied by a group of voltage-dividing resistors, as shown in FIG. 3, conventionally. The reference voltage provided by such kind of circuit is possibly influenced by the variation of the work voltage $V_{DD}$, and therefore an error of comparing result may occur during the operation of the comparator. The present invention utilizes a constant current generator 662 and an equivalent dynamic impedance-input circuit 661 to offer the reference voltage necessary for the comparator 64. Because the resistor 6611 and the MOS transistor M6612 perform the same functions as the resistor R61 and the MOS transistor M62, respectively, what are inputted into the comparator 64 respectively from the two input terminals 641 and 642 to be compared are the induced current generated by the photo diode 5 and the constant current generated by the constant current generator 662, rather than two voltages. By this way, the accuracy of the reference voltage can avoid being influenced by the variation of the work voltage $V_{DD}$. Therefore, the light-pass/light-shield state of the photo coupler can be identified clearly and accurately.

The value of the current generated by the constant current generator 662 can be adjusted by changing the resistance of the current-adjusting resistor R667 as long as the current value is within a current range in which the dynamic resistor means M62 is conducted but the dynamic resistor means B63 has not been conducted, i.e. the current range corresponding to the resistance range shown as section "b" of FIG. 5. On the other hand, if the value of the constant current generated by the constant current generator 662 is within a current range measured at the input terminal 641 of the comparator 64 when the dynamic resistor means B63 is conducted, i.e. the current range corresponding to the resistance range shown as section "c" of FIG. 5, another input resistor performing the same function as the dynamic resistor means B63 may be necessary for the dynamic impedance-input circuit 661.

To sum up, the most important improvement of the present invention over the prior art is the installation of the second dynamic resistor means preferably including a plurality of MOS transistors and a BJT. In addition, the modification for the reference voltage supply circuit also plays an important role for improving the function of the input device controller.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device controller to be used with an input device having a photo coupler generating an induce current in response to a received quantum of light comprising:

a first resistor means electrically connected to said photo coupler in order that said photo coupler has an output voltage in response to said induced current;

a second resistor means electrically connected to said photo coupler and having the resistance thereof varying with said output voltage for preventing said photo couple from being overcharged; and a controlling means electrically connected to said photo coupler for controlling a cursor on a monitor in response to said output voltage, wherein said controlling means includes a constant current generator and dynamic impedance input circuit, together generating a reference voltage for comparison with said output voltage.

2. A controller according to claim 1 wherein said controlling means includes:

a reference voltage supply circuit for supplying a reference voltage;

a comparator having a first input terminal electrically connected to said photo coupler and a second input terminal electrically connected to said reference voltage supply circuit for comparing said output voltage and said reference voltage to output a digital signal; and a shift controller electrically connected to said comparator for controlling a movement of said cursor on said monitor in response to said digital signal.

3. A controller according to claim 2 wherein:

said constant current generator generates a constant current; and said dynamic impedance-input circuit is electrically connected between said constant current generator and said second input terminal of said comparator, wherein the dynamic impedance-input circuit further includes a constant input resistor performing the same function as said first resistor means and a first dynamic input resistor performing the same function as said third resistor means so that said comparator is able to compare said output voltage of said photo coupler with said reference voltage by comparing said induced current generated by said photo diode with said constant current generated by said constant current generator.

4. A controller according to claim 3 wherein a value of said constant current generated by said constant current generator is within a current range measured at said first input terminal of said comparator when said second resistor means is conducted.

5. A controller according to claim 4 wherein said dynamic impedance-input circuit further includes a second dynamic input resistor electrically connected between said first dynamic input resistor and said second input terminal of said comparator.

6. A controller according to claim 5 wherein said second dynamic input resistor performs the same function as said second resistor means.

7. A controller according to claim 3, wherein said constant current generator includes:

a voltage-dividing resistor means including two resistors;

a voltage-dividing comparator, one input terminal of which is electrically connected between said two resistors of said voltage-dividing resistor means;

a MOSFET, a gate of which is electrically connected to an output terminal of said voltage-dividing comparator;

a current-adjusting resistor electrically connected to another input end of said voltage-dividing comparator and a source of said MOSFET for adjusting said constant current; and a current mirror electrically connected between a drain of said MOSFET and said dynamic impedance-input circuit.

8. A controller according to claim 1 wherein said first resistor means is a constant resistor.

9. A controller according to claim 1 wherein said second resistor means is a dynamic resistor means.

10. A controller according to claim 9 wherein said second resistor means includes a plurality of MOSFETs and a Bipolar Junction Transistor, and has the impedance thereof decrease with an increase of said output voltage of said photo coupler.

11. A controller according to claim 1 further comprising a third resistor means electrically connected between said first and said second resistor means and having the resistance thereof vary with said output voltage of said photo coupler.

12. A controller according to claim 11 wherein said third resistor means is a dynamic resistor means.

13. A controller according to claim 12 wherein said third resistor means includes a MOSFET and has the impedance thereof decrease with an increase of said output voltage of said photo coupler.

14. A controller according to claim 11 wherein a maximum value of the impedance of said third resistor means is smaller than that of said first resistor means but greater than that of said second resistor means.

15. A controller according to claim 1 wherein said input device is a mouse.

16. An input device controller to be used with an input device having a photo coupler generating an induced current in response to a received quantum of light comprising:

a first resistor means electrically connected to said photo coupler in order that said photo coupler has an output voltage in response to said induced current;

a second resistor means electrically connected to said photo coupler and having the resistance thereof varying with said output voltage;

a constant current generator for generating a constant current;

a dynamic impedance-input circuit electrically connected to said constant current generator and including a first input resistor performing the same function as said first resistor means and a second input resistor performing the same function as said second resistor means; and a controlling means electrically connected to said photo coupler and said constant current generator for controlling a movement of a cursor on a monitor in response to a compared result of said induced current and said constant current.

17. A controller according to claim 16 wherein each of said first resistor means and said first input resistor is a constant resistor.

18. A controller according to claim 16 wherein said controlling means includes:

a comparator having a first input terminal electrically connected to said photo coupler and a second input terminal electrically connected to said constant current generator for comparing said induced current and said constant current to output a digital signal; and a shift controller electrically connected to said comparator for controlling said movement of said cursor on said monitor in response to said digital signal.

19. A controller according to claim 18 wherein a value of said constant current generated by said constant current generator is within a current range measured at said first input terminal of said comparator if said second resistor means is not conducted.

20. A controller according to claim 16 wherein each of said second resistor means and said second input resistor is a dynamic resistor means including a MOSFET and the impedance thereof decreases with an increase of said output voltage of said photo coupler.

21. A controller according to claim 20 further comprising a third resistor means electrically connected to said photo coupler and having the resistance thereof varying with said output voltage, in which said dynamic impedance-input circuit further include a third input resistor electrically connected between said first input resistor and said second input terminal of said comparator and performing the same function as said third resistor means.

22. A controller according to claim 21 wherein each of said third resistor means and said third input resistor is a dynamic resistor means including a plurality of MOSFETs and a Bipolar Junction Transistor, and the impedance of said dynamic resistor means decreases with an increase of said output voltage of said photo coupler.

23. A controller according to claim 21 wherein a maximum of the impedance of said second resistor means is smaller than that of said first resistor means but greater than that of said third resistor means.

24. A controller according to claim 21 wherein a value of said constant current generated by said constant current generator is within a current range measured at said first input terminal of said comparator when said third resistor means is conducted.

25. A controller according to claim 16, wherein said constant current generator includes:

a voltage-dividing resistor means including two resistors;

a voltage-dividing comparator, one input terminal of which is electrically connected between said two resistors of said voltage-dividing resistor means;

a MOSFET, a gate of which is electrically connected to an output terminal of said voltage-dividing comparator;

a current-adjusting resistor electrically connected to another input end of said voltage-dividing comparator and a source of said MOSFET for adjusting said constant current; and a current mirror electrically connected between a drain of said MOSFET and said dynamic impedance-input circuit.

* * * * *